(No Model.)
G. COOK.
NUT LOCK.
No. 381,463. Patented Apr. 17, 1888.
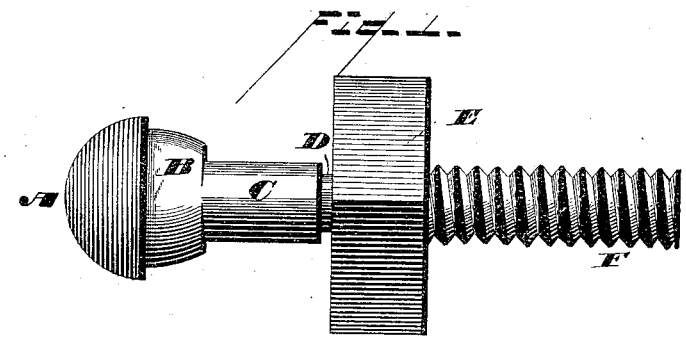
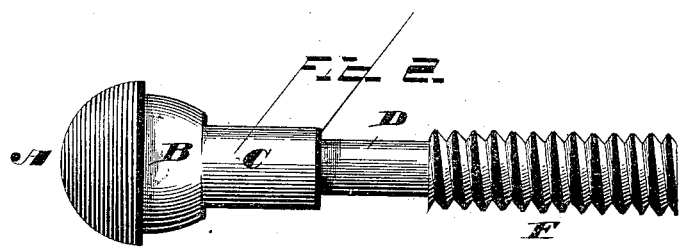
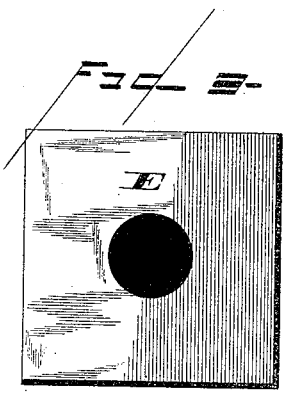
WITNESSES.
G. Cook.
INVENTOR.
By W. R. Stringfellow
Attorney.

UNITED STATES PATENT OFFICE.

GUSTAVE COOK, OF NEW ORLEANS, LOUISIANA, ASSIGNOR OF ONE-THIRD TO HILDER MAY & CO., OF SAME PLACE.

NUT-LOCK.

SPECIFICATION forming part of Letters Patent No. 381,463, dated April 17, 1888.

Application filed August 29, 1887. Serial No. 248,234. (No model.)

*To all whom it may concern:*

Be it known that I, GUSTAVE COOK, a citizen of the United States, residing at New Orleans, in the parish of Orleans and State of Louisiana, have invented certain new and useful Improvements in an Automatic Lock-Bolt; and I do declare the following to be a full, clear, and exact description of the invention, such as will enable others skilled in the art to which it appertains to make and use the same.

My invention relates to improvements in an automatic lock-bolt, in which a nut is made to operate in conjunction with a grooved bolt; and the objects of my improvements are to provide a bolt for fish-bars of railroad-tracks and bridges that will keep the nut on bolt in a positive position. I attain these objects by the mechanism illustrated in the accompanying drawings, in which—

Figure 1 is a side view of my improved bolt, showing a nut in the groove thereof. Fig. 2 is a similar view of the bolt with the nut removed, and Fig. 3 is a view of the nut.

Similar letters refer to similar parts throughout the several views.

In constructing my device I take the ordinary bolt—such as is in use for railroads or bridges—with the head A, shoulders B, and shank C, and threads F. On C at D I place a groove, so constructed that a nut will fit within same. This groove may be an eighth of an inch or more in depth, with square shoulders on each side, so that pressure on nut is uniform. In adjusting my bolt the same is placed through opening in fish-bar and opening in railway-bar, and nut is placed on thread of bolt in the usual manner and turned until it is forced within groove D, where it is kept in a secure position under all circumstances.

I do not confine myself to use of bolt for fish-bar plates on railway-tracks, but my device is especially adapted for bridge-bolts, keeping nut in a positive position. I am aware that nut-locks have heretofore been in use where two nuts were placed on threads of bolt and made self-acting. I do not claim such an invention; but What I do claim, and desire to secure by Letters Patent of the United States, is—

The headed bolt having the shoulder B, the reduced plain shank C, groove D, and the threaded portion F, in combination with a nut, substantially as specified.

In testimony whereof I affix my signature in presence of two witnesses.

GUSTAVE COOK.

Witnesses:
 HENRY J. RHODES,
 PERCY D. PARKS.